(12) United States Patent
Honickman et al.

(10) Patent No.: US 11,095,181 B2
(45) Date of Patent: Aug. 17, 2021

(54) ROTARY ELECTRIC MACHINE

(71) Applicant: LCDRIVES CORP., Potsdam, NY (US)

(72) Inventors: Matthew Honickman, Potsdam, NY (US); Russel Hugh Marvin, Potsdam, NY (US)

(73) Assignee: LCDRIVES CORP., Potsdam, NY (US)

( * ) Notice: Subject to any disclaimer, the term of this patent is extended or adjusted under 35 U.S.C. 154(b) by 29 days.

(21) Appl. No.: 16/745,465

(22) Filed: Jan. 17, 2020

(65) Prior Publication Data

US 2021/0226504 A1 Jul. 22, 2021

(51) Int. Cl.
| | |
|---|---|
| *H02K 1/14* | (2006.01) |
| *H02K 3/52* | (2006.01) |
| *H02K 15/00* | (2006.01) |
| *F16B 21/12* | (2006.01) |
| *H02K 3/48* | (2006.01) |
| *H02K 15/02* | (2006.01) |

(52) U.S. Cl.
CPC ............ *H02K 3/525* (2013.01); *F16B 21/12* (2013.01); *H02K 3/48* (2013.01); *H02K 15/0081* (2013.01); *H02K 15/028* (2013.01)

(58) Field of Classification Search
CPC ............ H02K 1/00; H02K 1/14; H02K 1/148; H02K 1/28
See application file for complete search history.

(56) References Cited

U.S. PATENT DOCUMENTS

| | | | | |
|---|---|---|---|---|
| 4,371,799 A | * | 2/1983 | De Wolf | H02K 1/17 310/154.07 |
| 6,107,718 A | * | 8/2000 | Schustek | H02K 1/148 310/216.086 |
| 7,045,925 B2 | * | 5/2006 | Frager | H02K 1/148 310/216.085 |
| 2002/0163275 A1 | | 11/2002 | Hsu | |
| 2006/0028087 A1 | * | 2/2006 | Ionel | H02K 29/03 310/216.086 |
| 2013/0106214 A1 | * | 5/2013 | Chang | H02K 3/522 310/71 |
| 2014/0300220 A1 | | 10/2014 | Marvin | |

* cited by examiner

*Primary Examiner* — Tran N Nguyen
(74) *Attorney, Agent, or Firm* — Tarolli, Sundheim, Covell & Tummino LLP (57) ABSTRACT

A stator for a rotary electric machine includes a core extending along an axis and having a series of axially extending passages arranged circumferentially about the axis. A plurality of teeth are provided with each tooth including an axially extending inner surface defining a passage and a projection extending therein. Retention devices secure each tooth to the stator. Each retention device includes a resilient member having a base extending within one of the passages of the stator and an arm extending from the base and within the passage of one of the teeth. The arm including an enlarged portion for engaging the projection to pull the tooth into engagement with the core.

22 Claims, 7 Drawing Sheets

ROTARY ELECTRIC MACHINE

TECHNICAL FIELD

The present invention relates generally to rotary electric machines, and specifically to a tooth retention device for rotary electric machines.

BACKGROUND

Motor stators are composed of two primary components, the winding coils and the stator core. In some motors, the stator core is composed of two components, namely, the yoke and the teeth. These two parts are made separately in order to facilitate installation of the winding coils and cooling system in the slots between the teeth.

Attaching the teeth to the stator core is challenging because the operational torque of the motor is transmitted from the teeth into the yoke and thereafter into the frame of the motor. Consequently, the teeth need to be structurally attached to the core to help ensure a secure connection therebetween during motor operation. Most common mechanical fastening systems are undesirable because they are metaling and introduce eddy current paths, which dramatically reduce the efficiency of the motor. Additionally, since the teeth and the stator yoke are typically of laminated construction, the fastening mechanism needs to act continuously along the length of the machine to achieve robust securing of the teeth to the core.

SUMMARY

In one example, a stator for a rotary electric machine includes a core extending along an axis and having a series of axially extending passages arranged circumferentially about the axis. A plurality of teeth are provided with each tooth including an axially extending inner surface defining a passage and a projection extending therein. Retention devices secure each tooth to the stator. Each retention device includes a resilient member having a base extending within one of the passages of the stator and an arm extending from the base and within the passage of one of the teeth. The arm including an enlarged portion for engaging the projection to pull the tooth into engagement with the core.

In another example, a stator for a rotary electric machine includes a core extending along an axis and having a series of axially extending passages arranged circumferentially about the axis. A plurality of teeth are provided with each tooth including an axially extending inner surface defining a passage. Retention devices are provided for securing each tooth to the stator. Each retention device includes a resilient member having a base extending within one of the passages of the stator and an arm extending from the base and within the passage of one of the teeth. The resilient member is electrically insulated from the core and the tooth.

In another example, a retention device for releasably securing a tooth of a rotary electric machine to a stator core is provided. The stator core includes a passage and the tooth has a passage with a projection extending therein. The retention device includes a resilient member having a hollow base for extending into the passage in the stator core and an arm extending from the base and configured for positioning within the passage in the tooth. The base has an enlarged condition engaging the core such that an enlarged portion of the arm engages the projection to pull the tooth into biased engagement with the core.

Other objects and advantages and a fuller understanding of the invention will be had from the following detailed description and the accompanying drawings.

DETAILED DESCRIPTION

Figure 1:
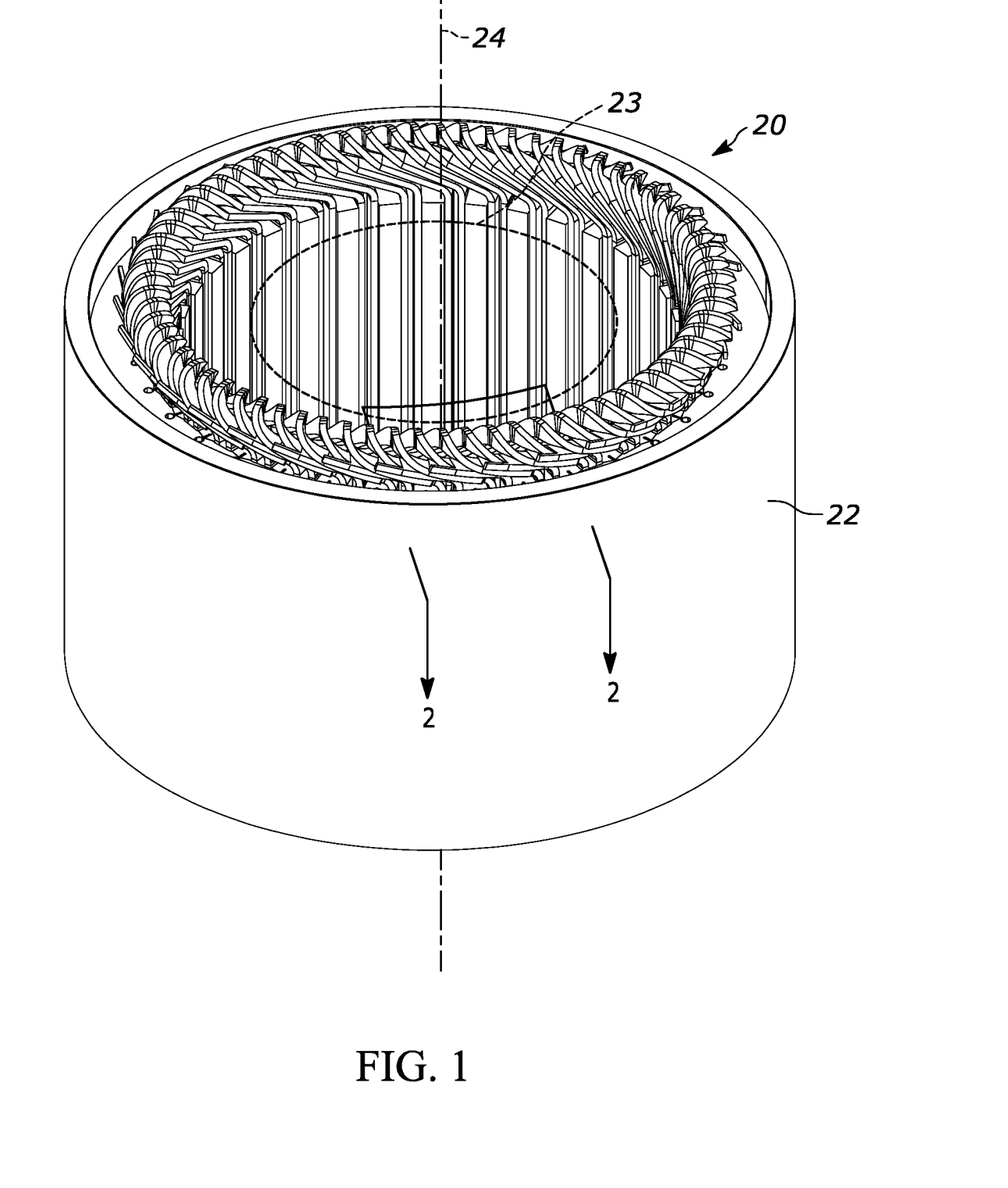
FIG. 1 is a front view of a rotary electric machine having one example tooth retaining device.
Figure 2:
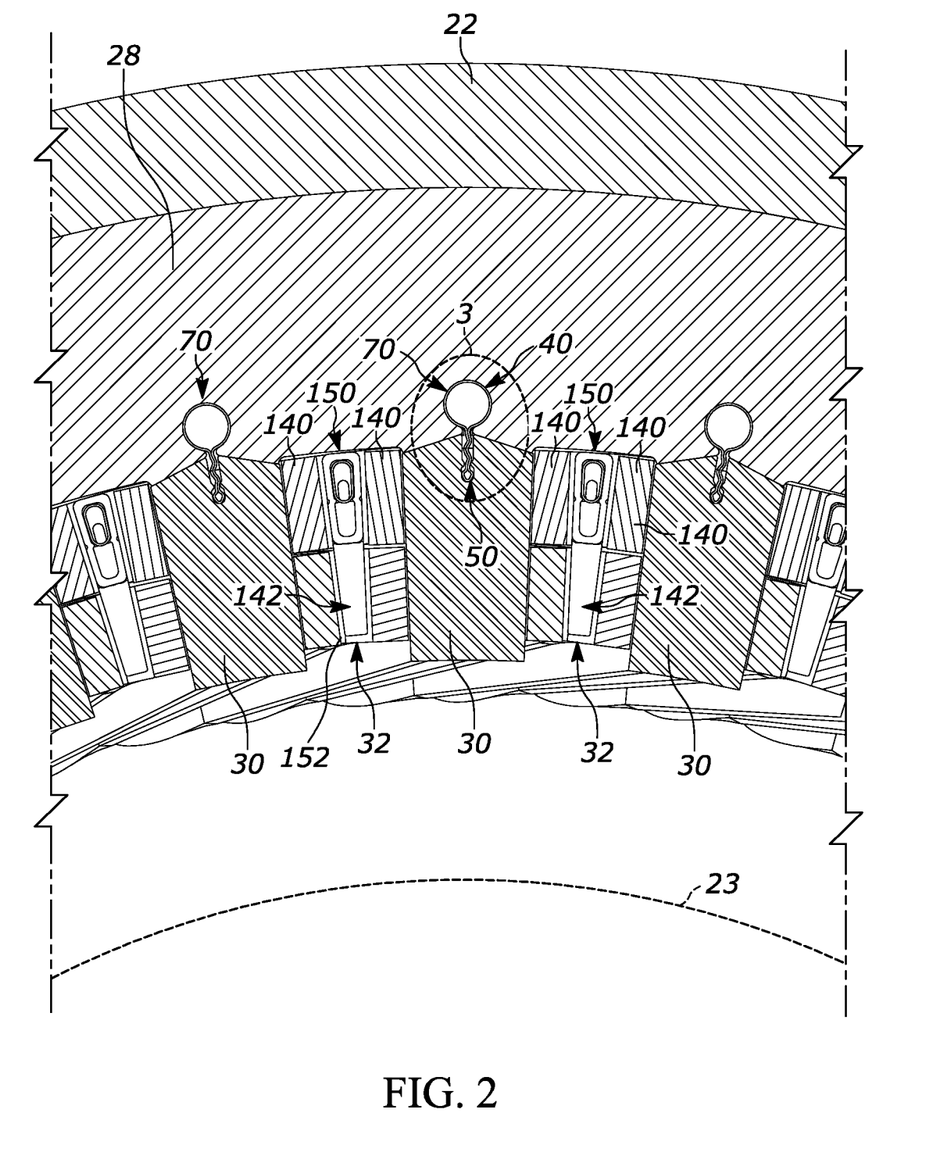
FIG. 2 is a section view of the rotary electric machine taken along lines 2-2 of FIG. 1.

The present invention relates generally to rotary electric machines, and specifically to a tooth retention device for rotary electric machines. Referring to FIGS. 1-2, one example rotary electric machine 20 includes a stator 22 extending about and along an axis 24. A rotor 23 (shown in phantom in FIG. 1) is positioned within the stator 22 and is rotatable about the axis 24 relative to the stator 22.

The stator 22 includes a ring-shaped core 28 formed from stacked laminations made from an electrically conductive material. Teeth 30 extend radially inward from the core 28 towards the axis 24. In one example, both the core 28 and teeth 30 can be made from laminated steel, such as silicon steel. Alternatively, the core 28 and/or teeth 30 can be made from a powdered magnetic material.

Regardless, the teeth 30 are arranged circumferentially about the axis 24 and extend substantially the entire axial length of the stator 22. Each tooth 30 includes a pair of outer surfaces 66a, 66b that engage and form interfaces with an inner surface 46 of the core 28. The teeth 30 are circumferentially spaced apart from one another by slots 32 and releasably connected to the core 28 with tooth retention devices 70 (see FIG. 3). To this end, inner surfaces 38 of the core 28 define a series of passages 40 extending along the axial length of the core. As shown, the passages 40 are substantially cylindrical.

Figure 3:
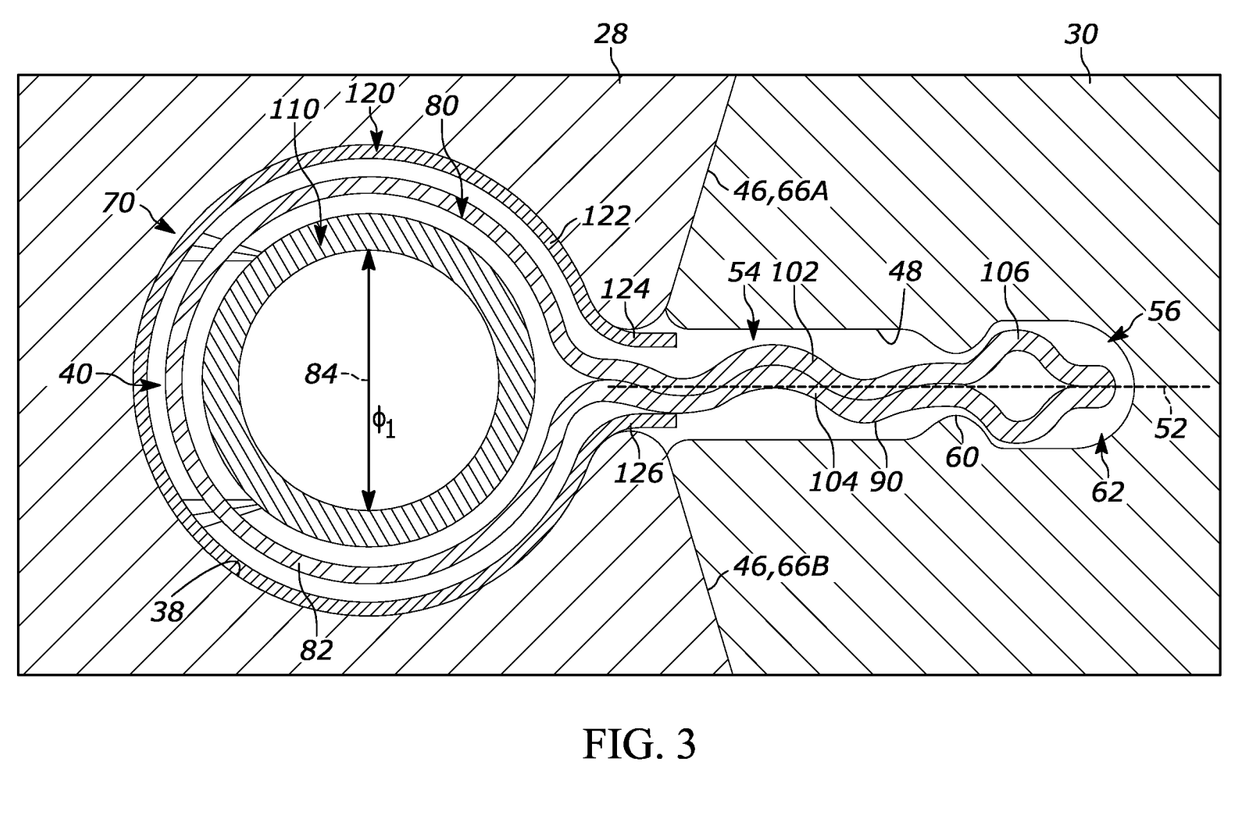
FIG. 3 is an enlarged view of a portion of FIG. 2.

An inner surface 48 on each tooth 30 defines a passage 50 extending along the axial length of the tooth. Each tooth retention device 70 extends into the passage 40 in the core 28 and a corresponding passage 50 in one of the teeth 30. The passages 50 are elongated in the radial direction and extend along a centerline 52. A projection 60 extends from the inner surface 48 towards the centerline 52 and defines a pocket 62 of the passage 50.

Figure 4A:
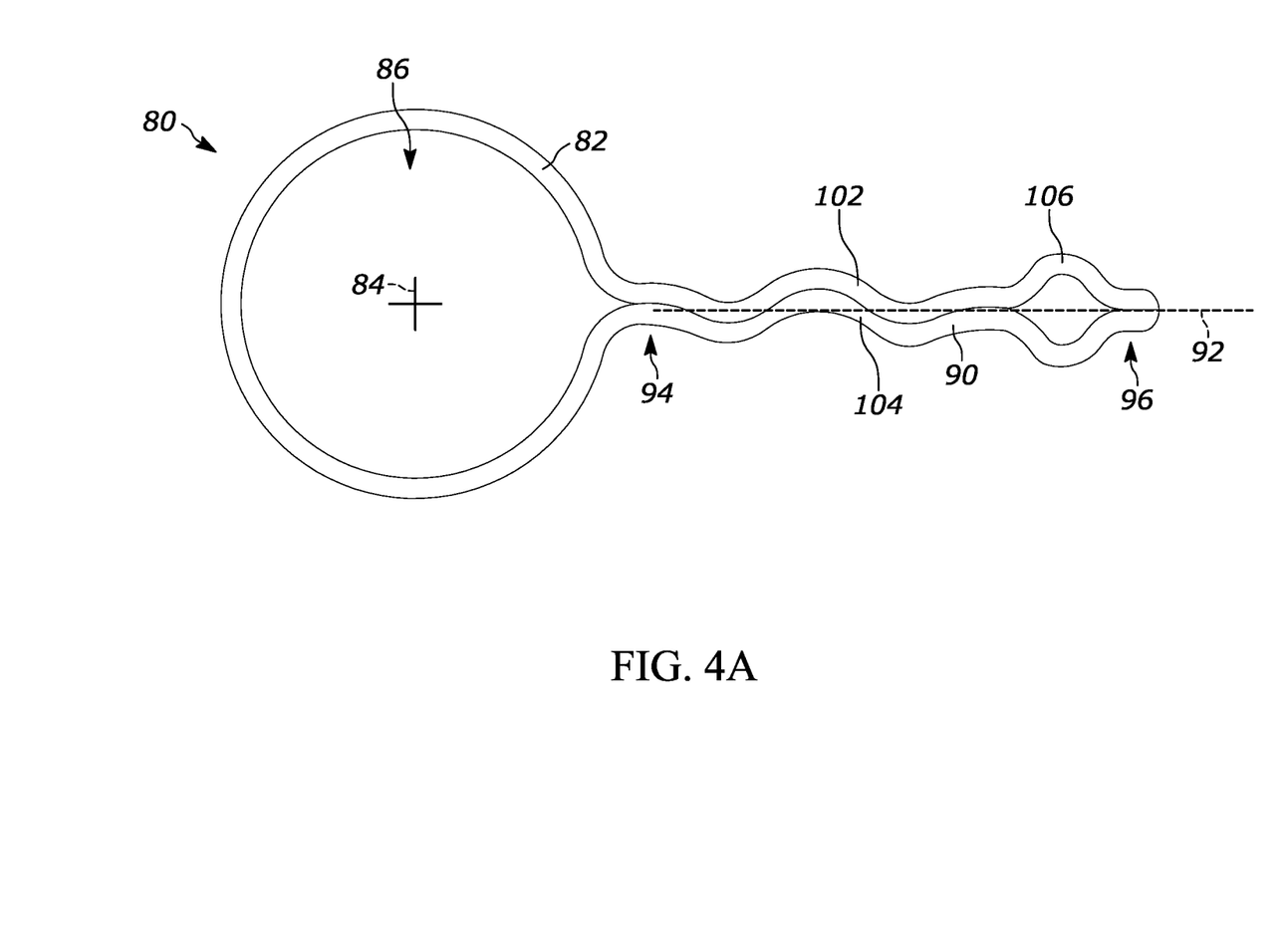
FIG. 4A is a top view of a resilient member of the tooth retaining device.
Figure 4B:
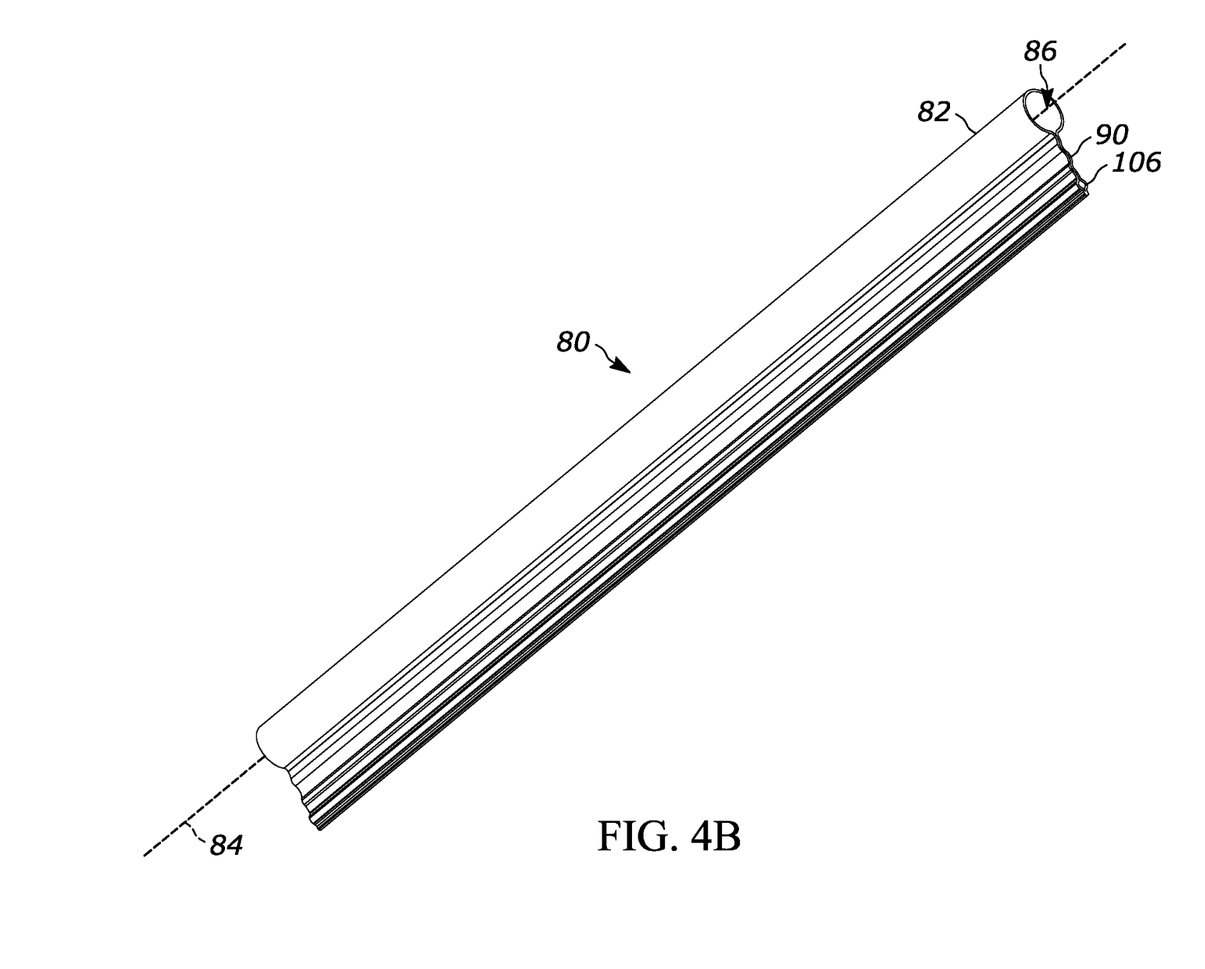
FIG. 4B is a front view of the resilient member of FIG. 4.

The retention devices 70 are provided in the passages 40, 50 to connect each tooth 30 to the core 28 and prevent relative axial and radial movement therebetween. Referring further to FIGS. 4A-4B, each retention device 70 includes a resilient member 80 having a base 82 and an arm 90 extending outward from the base. The base is 82 positioned within the passage 40 in the core 28. The arm 90 is positioned within the passage 50 in one of the teeth 30. The resilient member 80 can be made of made, for example, spring steel.

Referring further to FIGS. 4A-4B, the base 82 can be round/circular in axial cross-section (as shown) or polygonal, e.g., triangular, square, etc. (not shown). The base 82 extends longitudinally along a centerline 84 and can define a passage 86 extending its entire length. The arm 90 extends from the base 82 along a centerline 92 extending radially outward from the centerline 84. The arm 90 extends from a first end 94 connected to the base 82 to a second end 96 spaced radially outward from the first end relative to the centerline 84.

The arm 90 includes a pair of legs 102, 104 and a portion 106 interconnecting the legs 102, 104. The legs 102, 104 can engage one another or be spaced from one another when in an initial, unstressed condition (FIG. 4A). Each leg 102, 104 can be curved, e.g., wave-shaped (as shown), or straight (not shown). In the straight arm 90 configuration, the legs 102, 104 can extend parallel to one another or be angled relative to one another. Curved or non-linear legs 102, 104 allow the resilient member 80 to be more flexible and compliant than straight legs.

The connecting portion 106 can be positioned along the centerline 92 at the second end 96 of the arm 90. The connecting portion 106 can be enlarged relative to the legs 102, 104, e.g., extend outward from the centerline 92 further than the legs 102, 104 (whether the legs 102, 104 are curved or straight). Consequently, the arm 90 can have a generally u-shaped, hairpin configuration. The resilient member 80 can be made of a durable material, such as steel, e.g., stainless steel. The resilient member 80 can be coated with a non-conductive material having a hardness greater than at least the material of the core 28 or the material of the teeth 30. The resilient member 80 can also be coated, wrapped or otherwise covered with an electrically insulating material (not shown).

Figure 5:
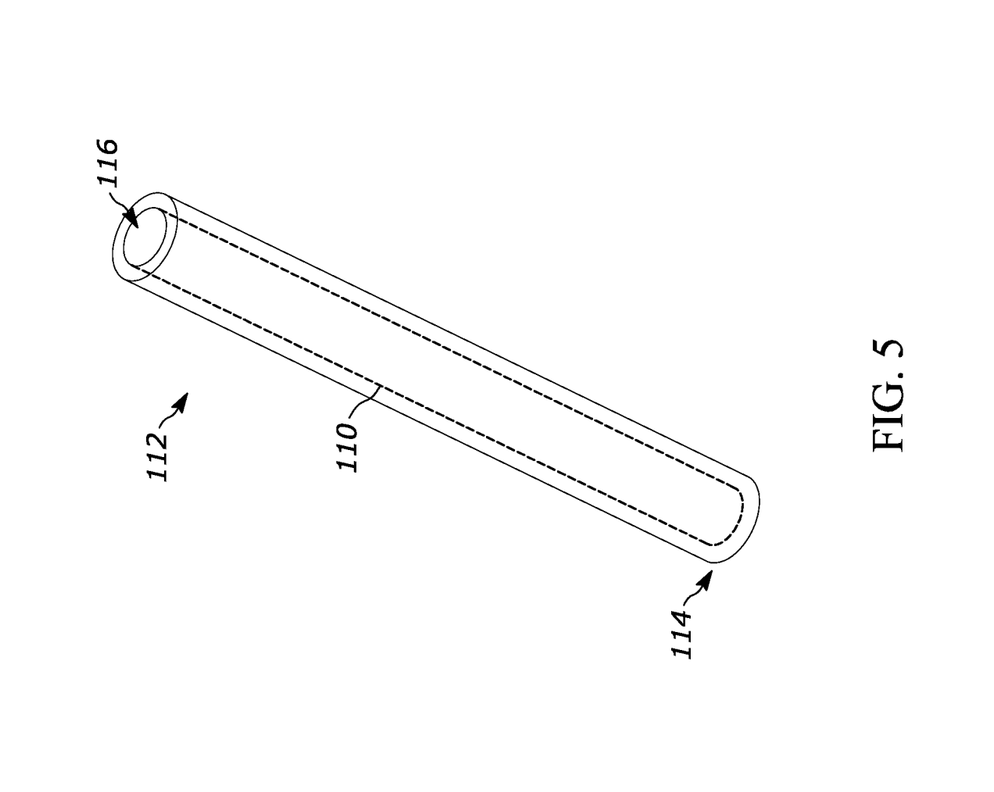
FIG. 5 is a schematic illustration of a supporting member of the tooth retention device.
Figure 6:
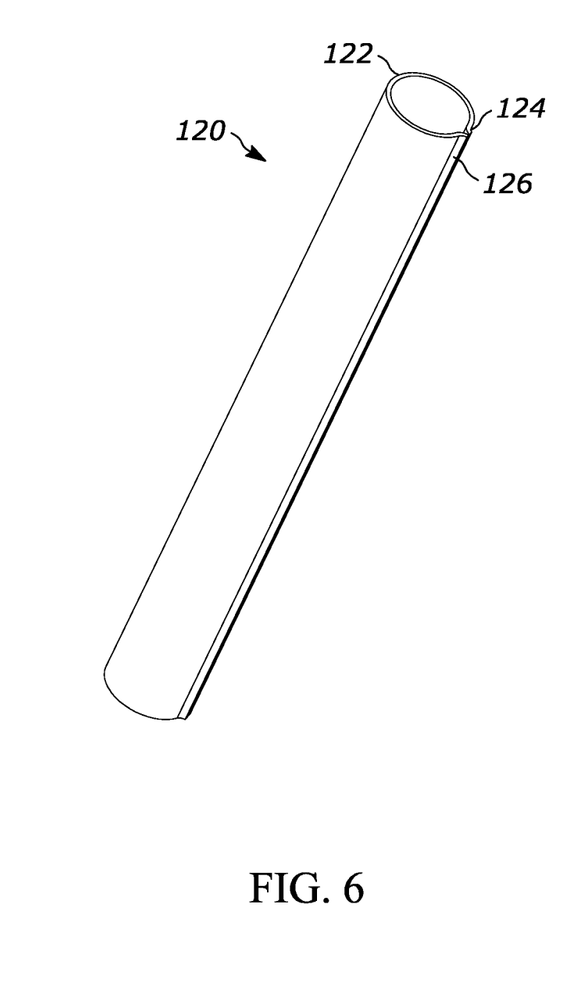
FIG. 6 is a schematic illustration of an insulating member of the tooth retention device.

The retaining device 70 can optionally include a supporting member 110 (FIG. 5) and/or an insulating sleeve 120 (FIG. 6). When present, the supporting member 110 and insulating sleeve 120 have substantially the same length as the resilient member 80 and are provided within the passage 86 of the base 82 (see also FIG. 3).

Referring to FIG. 5, the supporting member 110 extends from a first end 112 to a second end 114 and includes a passage 116 extending along the length of the supporting member. The second end 114 of the supporting member 110 can be closed off or sealed such that the passage 116 terminates prior to reaching the axial extent of the second end. The supporting member 110 can be formed from metal, e.g., stainless steel.

Referring to FIG. 6, the sleeve 120 (FIG. 6) extends around at least a portion of the resilient member 80 (see also FIG. 3). The sleeve 120 has a round or circular base 122 and a pair of legs 124, 126 extending therefrom. Consequently, the sleeve 120 can have a substantially c-shaped longitudinal cross-section. The sleeve 120 can be formed from an electrically insulating material and/or be coated with an electrically insulating material. To this end, the sleeve 120 can be formed from a piece of metal coated or covered with electrically insulating material.

Alternatively or additionally, an electrically insulating layer or material can be applied to or coated on the inner surface 38 of the core 28 defining the passage 40 and/or the inner surface 48 of the tooth 30 defining the passage 50. In any case, the electrically insulating material in the core 28 or tooth 30 or on the resilient member 80 can be an enamel or diamond-like carbon that is harder than at least one of the material of the core 28 or the material of the tooth 30. Regardless of the particular construction, insulating the resilient member 80 from the core 28 and tooth 30 helps to prevent the resilient member from providing an electrical path between laminations, which would allow larger eddy currents to flow.

Returning to FIG. 2, winding coils 140 formed from one or more conductors, e.g., electrically conductive material such as copper, are wound around the teeth 30 and pass through the slots 32. In one example, the winding coils 140 are wound in a 3-phase configuration such that a portion of the winding coils are in phase A, a portion of the winding coils are in phase B, and a portion of the winding coils are in phase C. Each phase A-C receives the same or substantially the same amount of current. Other phase configurations are contemplated. Multiple winding coils 140 can be electrically connected in series or in parallel and still receive the same amount of current. In a 3-phase configuration, phases can be connected in either a wye or delta configuration.

The winding coils 140 can be wound onto the stator 22 in any number of known manners, e.g., concentrated wound, distributed wound or hairpin wound. As shown, the winding coils 140 are formed from rectangular wire bent into a diamond shape and distributed wound around the teeth 30. The winding coils 140 are oriented in the slot 32 such that in cross-section the length (the longer dimension) extends radially towards the axis 24. The width (the smaller dimension) extends generally circumferentially about the axis 24. Multiple winding coils 140 in the same slot 32 are arranged abutting or adjacent one another in the radial direction and abutting or adjacent the associated tooth 30.

A circumferential space or gap 142 can be formed in the slot 32 between adjacent pairs of winding coils 140. A cooling device 150 is provided within each gap 142 for cooling the winding coils 140 during operation of the rotary electric machine 20. A liner 152 formed from electrically insulating material, e.g., an aramid polymer, is provided in the gap 142 and is wrapped around the cooling device 150. Consequently, the liner 152 is provided circumferentially between the winding coils 140 in the same slot 32 and circumferentially between the cooling device 150 and each winding coil 140. The liner 152 can extend substantially the entire axial and radial lengths of the slot 32. Alternatively, the liner 152 can be omitted (not shown) such that the cooling device 150 abuts multiple winding coils 140 in the slot 32.

To assemble the stator 20, the teeth 30 are held in a fixture separate from the core 28. The arm 90 on each resilient member 80 is inserted axially into the passage 50 on each tooth 30 such that the connecting portion 106 is positioned to the right (as shown in FIG. 3) of the projection 60 and within the pocket 62. It will be appreciated that a single resilient member 80 can extend the entire length of each passage 40 or two or more identical, separate resilient members can collectively occupy the entire axial length of the passage 40 in an end-to-end manner (not shown). The winding coils 140 and cooling device 150 are placed in each slot 32 to form a sub-assembly.

The insulating sleeves 120 are provided in the passages 40 or the insulating coating applied to the inner surface 38. The core 28 is then aligned with and positioned over the sub-assembly such that the passages 40 in the core 28 are radially aligned with the passages 50 in the teeth 30. The base 82 of each resilient member 80 is positioned within the passage 40 while the arm 90 extends into the passage 50. The enlarged connecting portion 106 is positioned within the pocket 62, with the projection 60 preventing the connecting portion from exiting the pocket. In other words, the enlarged connecting portion 106 helps to prevent the arm 90 from being pulled being pulled out of the passage 50 along the centerline 52.

Once the resilient member 80 is positioned in the passages 40, 50, the supporting member 110 is inserted into the passage 86. At this point, the supporting member 110 has a first inner diameter $\phi_1$ (see FIG. 3). The resilient member 80 has a relaxed or first condition spaced from or otherwise not applying a radially outward force upon either inner surface 38, 48, whether directly or indirectly via the sleeve 120 (when present).

Figure 7:
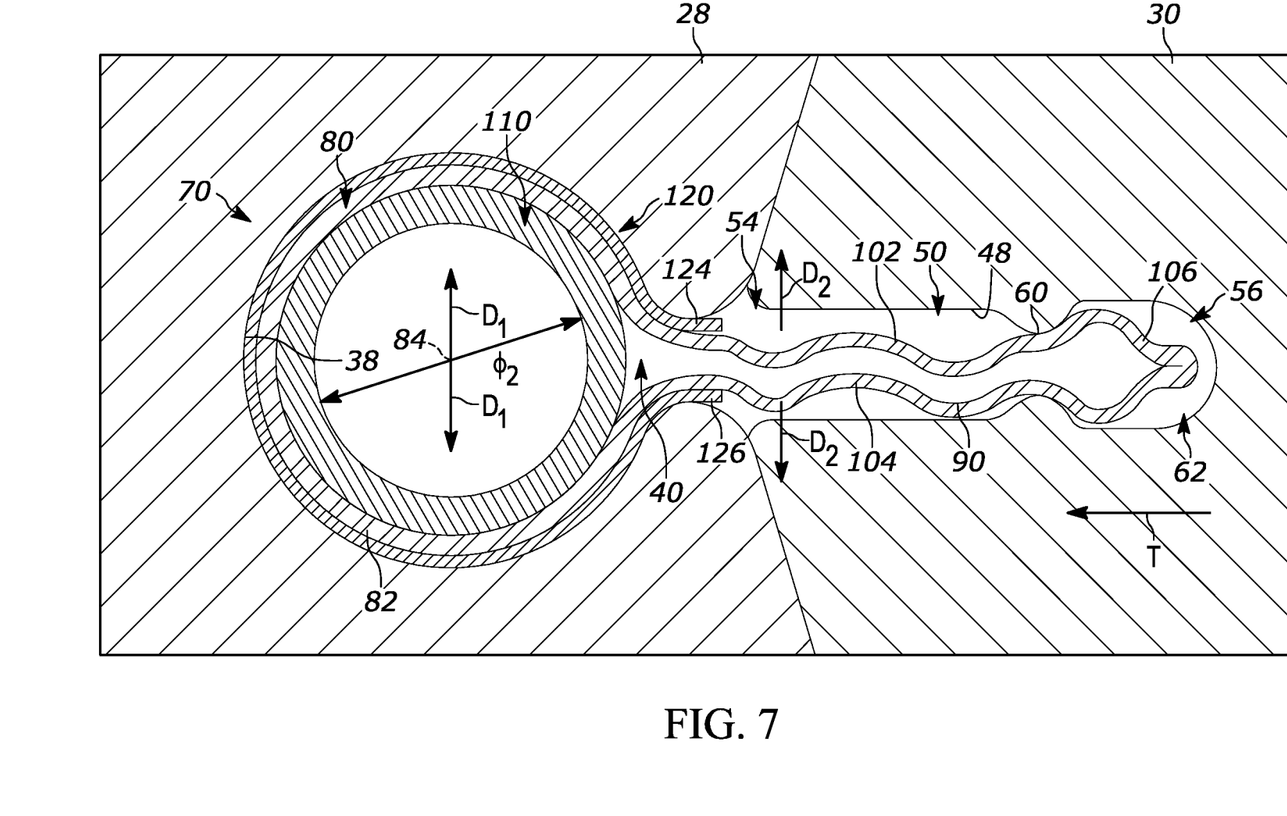
FIG. 7 is a schematic illustration of the tooth retention device in an expanded condition.

The supporting member 110 is radially expanded by known methods outward in the manner indicated by the arrows $D_1$ in FIG. 7. The expanding supporting member 110 eventually abuts the base 82 of the resilient member 80. The base 82 is plastically deformed outward in the manner $D_1$ towards the inner surface 38. The base 82 expands until it fits tightly within the passage 40 by pressing the sleeve 120 against the inner surface 38. When the sleeve 120 is omitted (not shown), the base 82 presses tightly directly against the inner surface 38. In either case, the resilient member 80 is plastically deformed to an expanded, second condition applying outward radial forces upon the passage 40 in the stator 22 by expanding the supporting member 110 to a second inner diameter $\phi_2$ greater than the first inner diameter $\phi_1$. The base 82 can alternatively be directly expanded by known methods, i.e., without using the supporting member 110.

Since the resilient member 80 is plastically deformed by the expanding supporting member 110, the resilient member remains in the expanded condition when the supporting member is removed from the passage 116. The supporting member 110 can be plastically deformed by being radially expanded and remain within the base 82 in tight abutment therewith or contract following expansion of the resilient member 80 (not shown) and be extracted from the passage 40.

It will be appreciated that as the base 82 expands, the legs 102, 104 of the arm 90 connected thereto can be urged apart from one another and apart from the centerline 92 in the manner $D_2$. The legs 102, 104 can be moved into engagement with the inner surface 38, the sleeve 120 and/or the inner surface 48. Urging the legs 102, 104 away from one another helps to further secure the arm 90 within the passage 50. To this end, spreading the legs 102, 104 apart at the first end 94 in the manner $D_2$ can cause the legs to likewise spread apart at the second end 96 in the manner $D_2$ into biased engagement with the projection 60. This biased engagement helps increase the resistance to movement of the connecting portion 106 out of the pocket 62 and past the projection 60. Moreover, since the base 82 is plastically deformed into the expanded condition, the legs 102, 104 remain in biased engagement with the inner surface 48 and projection 60.

Additionally, expanding the base 82 causes the legs 102, 104 to attempt to move towards the passage 40 in the manner indicated generally by the arrow T in FIG. 7. The engagement between the connecting portion 106 and the projection 60, however, prevents the connecting portion from sliding past the projection. Consequently, expanding the base 82 tensions the arm 90 and causes the tooth 30 to be pulled towards the core 28 in the direction T and held in biased engagement therewith. In other words, the resilient member 80 is elastically deformed to a pre-loaded condition that biases the tooth 30 into engagement with the core 28.

In another example (not shown), the resilient member 82 is sized to form a friction fit with the inner surfaces 38, 48 without requiring expansion by the supporting member 110. For instance, the base 82 can have an initial outer diameter greater than the inner diameter of the 40. The base 82 can be compressed to an outer diameter that allows for insertion into the passage 40 while the arm 90 is inserted into the passage 50. Releasing the base 82 allows the base to naturally expand into engagement with the inner surface 38 while simultaneously causing the legs 102, 104 to move in the manner $D_2$ into engagement with the inner surface 48 and projection 60.

In other words, the resilient member 80 can be configured to expand in response to the release of compression to simulate/replicate the expansion induced by expanding the supporting member 110. In this configuration, the sleeve 120 can be omitted or provided between the resilient member 80 and the inner surface 38. Regardless, expanding the base 82 tensions the arm 90 and thereby pulls the tooth 30 in the direction T into biased or pre-loaded engagement with the core 28.

The tooth retention device shown and described herein is advantageous in that it provides a secure, pre-loaded or tensioned connection between the stator and the teeth along the entire axial length of the tooth. The secure connection is accomplished without inducing eddy current loops in/around the winding coils or compromising the stator laminations. In other words, the connection is compact and does not adversely affect the magnetic performance of the stator core.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A stator for a rotary electric machine comprising:
   a core extending along an axis and including a series of axially extending passages arranged circumferentially about the axis;
   a plurality of teeth, each including an axially extending inner surface defining a passage and a projection extending therein; and
   retention devices for securing each tooth to the stator, each retention device including a resilient member having a base extending within one of the series of axially extending passages of the core of the stator and an arm extending from the base and within the passage of one of the teeth, the arm including an enlarged portion for engaging the projection to pull the tooth into engagement with the core.

2. The stator recited in claim 1, wherein the base has a round axial cross-section and the arm is wave-shaped.

3. The stator recited in claim 1, wherein the arm is straight.

4. The stator recited in claim 1, wherein the base is hollow.

5. The stator recited in claim 1, wherein the base has an expanded condition engaging an inner surface of the core defining the passage.

6. The stator recited in claim 5, wherein in the expanded condition the arm pulls the tooth into biased engagement with the core.

7. The stator recited in claim 5 further comprising a supporting member positioned in the base and radially expandable to place the base in the expanded condition.

8. The stator recited in claim 7, wherein the supporting member is made of stainless steel.

9. The stator recited in claim 1 further comprising an insulating material covering the resilient member to electrically insulate the resilient member from the core and the tooth.

10. The stator recited in claim 1 further comprising:
an electrically insulating material positioned between the base and the core; and
an electrically insulating material positioned between the arm and the inner surface defining the passage in the tooth.

11. The stator recited in claim 1, wherein the resilient member is electrically insulated from the core and the tooth.

12. A stator for a rotary electric machine comprising:
a core extending along an axis and including a series of axially extending passages arranged circumferentially about the axis;
a plurality of teeth, each including an axially extending inner surface defining a passage; and
retention devices for securing each tooth to the stator, each retention device including a resilient member having a base extending within one of the series of axially extending passages of the core of the stator and an arm extending from the base and within the passage of one of the teeth, the resilient member being electrically insulated from the core and the tooth.

13. The stator recited in claim 12, wherein each tooth includes a projection extending into the passage thereof, the arm of each retention device including an enlarged portion for engaging the projection to pull the tooth into engagement with the core.

14. The stator recited in claim 12, wherein the resilient member is coated with an electrically insulating material.

15. The stator recited in claim 12 wherein the resilient member is electrically insulated from the core and the tooth by:
an electrically insulating material positioned between the base and the core; and
an electrically insulating material positioned between the arm and the inner surface defining the passage in the tooth.

16. A retention device for releasably securing a tooth of a rotary electric machine to a stator core, the stator core including a passage and the tooth having a passage with a projection extending therein, comprising:
a resilient member having a hollow base for extending into the passage in the stator core and an arm extending from the base and configured for positioning within the passage in the tooth, the base having an expanded condition engaging the core such that an enlarged portion of the arm engages the projection to pull the tooth into biased engagement with the core.

17. The retention device recited in claim 16, wherein the base has a round axial cross-section and the arm is wave-shaped.

18. The retention device recited in claim 16, wherein the base is hollow.

19. The retention device recited in claim 16, wherein the resilient member is formed from spring steel.

20. The retention device recited in claim 16 further comprising a supporting member positioned in the base and radially expandable to place the base in the expanded condition.

21. The retention device recited in claim 20, wherein the supporting member is made of stainless steel.

22. The retention device recited in claim 16, wherein a projection extends into the passage in the tooth, the arm including an enlarged portion for engaging the projection to tension the tooth into engagement with the core.

* * * * *